Figure 1:
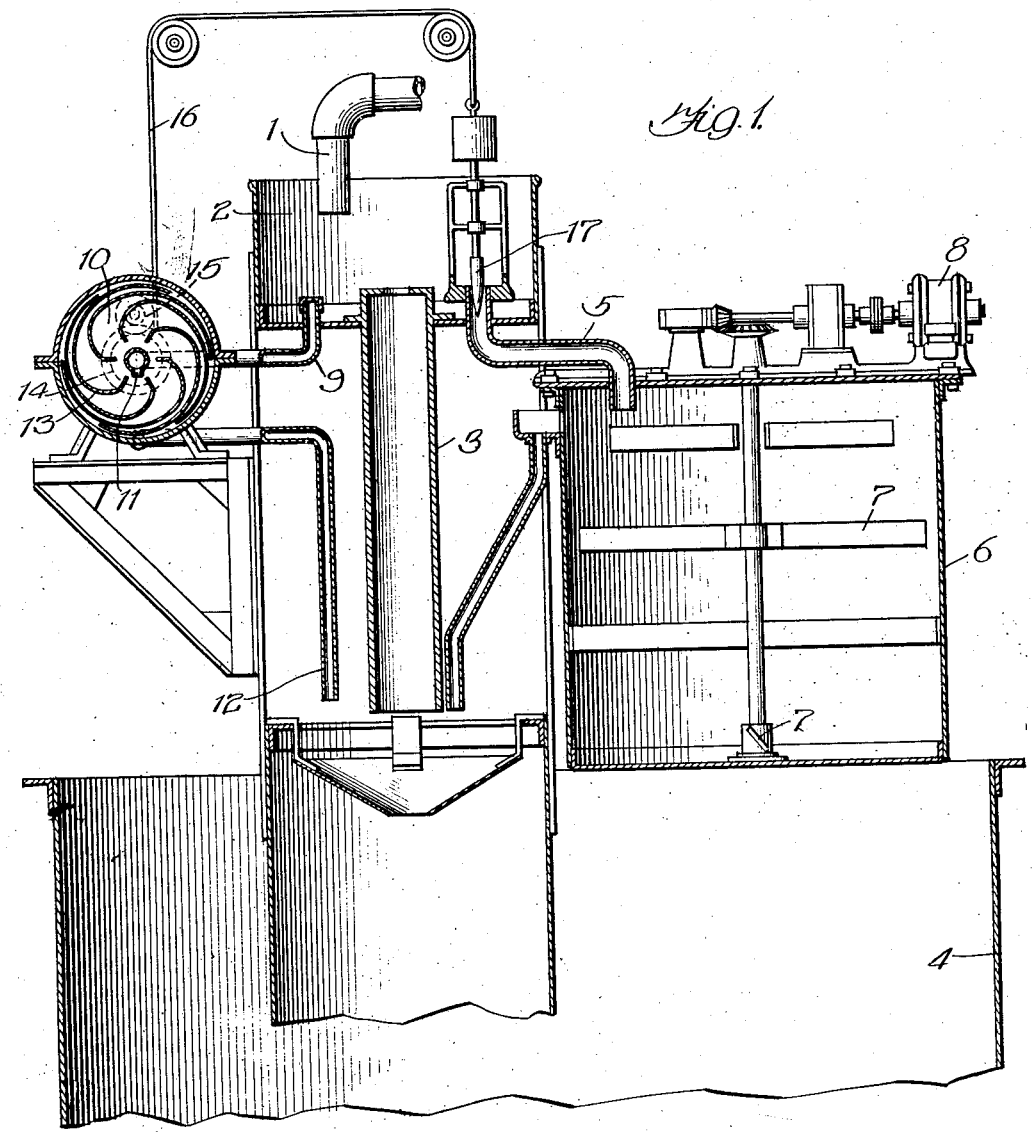

K. W. BARTLETT.
LIQUID TREATING APPARATUS.
APPLICATION FILED MAR. 15, 1916.

1,186,161.

Patented June 6, 1916.
2 SHEETS—SHEET 1.

Inventor:
Kent W. Bartlett.
By G. L. Bragg Atty.

K. W. BARTLETT.
LIQUID TREATING APPARATUS.
APPLICATION FILED MAR. 15, 1916.
1,186,161.
Patented June 6, 1916.
2 SHEETS—SHEET 2.
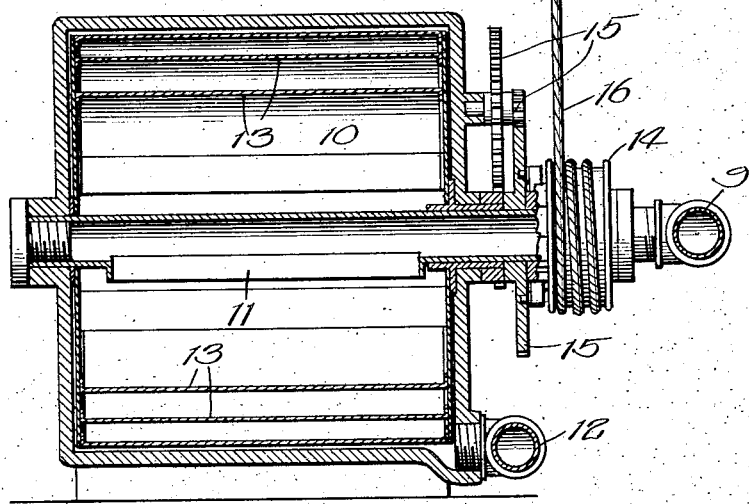
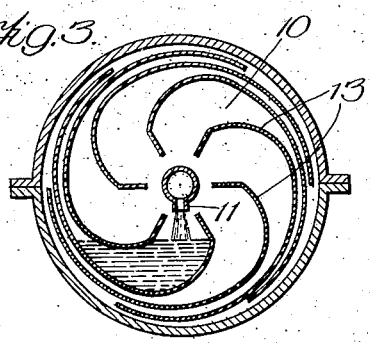
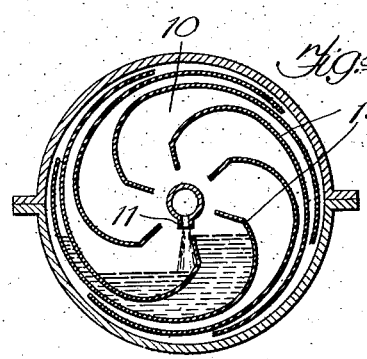
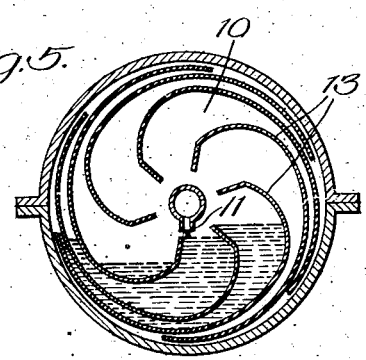
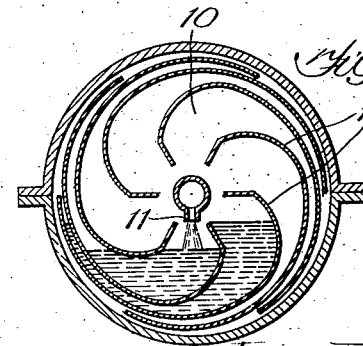
Inventor:
Kent W. Bartlett.
By G. L. Gragg Atty.

UNITED STATES PATENT OFFICE.

KENT W. BARTLETT, OF HAMMOND, INDIANA.

LIQUID-TREATING APPARATUS.

1,186,161. Specification of Letters Patent. Patented June 6, 1916.

Application filed March 15, 1916. Serial No. 84,282.

*To all whom it may concern:*

Be it known that I, KENT W. BARTLETT, a citizen of the United States, residing at Hammond, in the county of Lake and State of Indiana, have invented a certain new and useful Improvement in Liquid-Treating Apparatus, of which the following is a full, clear, concise, and exact description, reference being had to the accompanying drawings forming a part of this specification.

My invention relates to liquid treating apparatus and is of especial utility when employed for softening water.

My invention resides in employing improved means for controlling the admission of chemical to a settling tank that contains the liquid to be treated whereby the chemical and liquid may be contained within said tank in a fixed proportion which is predetermined by the analysis of the liquid, such improved means having been employed in one form of the invention to operate a tapered plug valve for the purpose of effecting increasing flow of chemical diluting water or other liquid into a chemical tank containing a charge of chemical, the flow of diluted chemical into the settling tank from the chemical tank progressively increasing to compensate for the reduction in strength of the chemical. My invention, however, is not to be limited to the control of the flow of progressively weakened chemical to the settling tank.

In practising my invention I employ a bucket wheel that governs the means that regulates the flow of chemical to the settling tank from the chemical tank and as the invention finds its most important use in softening water a further description thereof will be given in connection with such use. This wheel is operated by a stream of the unsoftened water which is desirably only a part of the water that flows from the unsoftened or hard water supply toward the settling tank, the water flowing to the settling tank being desirably divided into three streams, one flowing directly to the settling tank, another to the chemical tank and from thence to the settling tank and the third to the turning element from which it is desirably discharged into the settling tank. The rate of operation of the turning element thus depends upon the rate of flow of the hard or unsoftened water, a novel feature of the turning element residing in the fact that the torque exerted thereupon by the running water is proportional to the rate of flow of the water, this proportion not being disturbed by the variation in water pressure and other disturbing factors which attend the operation of the overshot water wheels that have been employed in the main passage of hard water to settling tanks to regulate the flow of chemical.

The preferred embodiment of my invention constitutes an improvement upon the apparatus disclosed in my Patent 1,017,729, dated February 20, 1912 which shows the use of the tapered plug hitherto mentioned. In accordance with my present invention this plug is suspended from a cord that is attached to a drum turned at a much reduced rate of speed with respect to the wheel that drives the drum through speed reducing gearing, this wheel being actuated by water flowing in one of the streams into which the main stream flowing toward the settling tank is divided. This wheel is formed of a plurality of wheel propelling buckets adapted successively to receive the water flowing thereto, water being accumulated in each bucket before the turning wheel moves a preceding filled bucket into discharging position whereby the ratio of rotation of the bucket with respect to the flowing hard water is not thrown out of adjustment by those factors which cause overshot water wheels employed for regulating the flow of chemical to turn at improper ratios with respect to the flowing water.

I will explain my invention more fully by reference to the accompanying drawings in which—

Figure 1 is a diagram illustrative of my invention; Fig. 2 is a longitudinal sectional view of the wheel structure; and Figs. 3, 4, 5 and 6 are diagrammatic illustrations of successive stages of operation of the water wheel.

Like parts are indicated by similar characters of reference throughout the different figures.

The hard water to be softened is conveyed to the apparatus by a pipe 1 discharging into a hard water receiving tank 2 that has three outlets, the main outlet 3 discharging into a settling tank 4. One of the other outlets 5 discharges into a chemical tank 6 in which there is mounted a stirrer 7 driven by a motor 8 by mechanism which need not be described. The third outlet 9 leads from the hard water tank 2 to the central portion of the water wheel 10, this outlet 9 being in the form of a stationary pipe having an elongated slot 11 on its under side where the water is discharged into the water wheel. The water that issues from the water wheel is led through a pipe 12 that preferably leads to the settling tank to avoid wastage of the water. The water wheel is subdivided into a number of buckets 13 that are preferably substantially of cycloidal formation in their curved water holding portions. The water wheel is connected with a drum 14 by a speed reduction gearing 15, the speed of the drum being, for example, one one-thousandth that of a wheel. This drum is connected by a cord 16 with a tapered plug valve 17, the orifice in which the plug valve is received progressively increasing in liquid conveying capacity as the plug is caused to rise consequent upon the turning of the water wheel, the plug being so shaped that the volume of water flowing to the chemical tank will be progressively increased to compensate for the reduction in strength of chemical in the chemical tank, the chemical flowing from the chemical tank to the settling tank at the same rate at which water is permitted to flow into the chemical tank by the valve 17.

Figs. 3, 4, 5 and 6 diagrammatically illustrate the operation of the water wheel and illustrate how the water wheel is unresponsive to disturbing factors that have hitherto caused overshot water wheels to disturb the proper ratio of the chemical flow with respect to the hard water flow. In these latter four figures the buckets marked A, B and C are shown each in successive positions. Each bucket tapers toward its outlet and the buckets are so extended that each bucket cannot discharge its contents until after such bucket is filled and desirably not until the next succeeding bucket is nearly filled and the third succeeding bucket is slightly filled. By this arrangement it is quite apparent that the rotation of the wheel must be in exact proportion to the rate of flow of the hard water and that therefore the progressive elevation of the plug valve 17 must be at such a rate that the supply of hard water to the chemical tank progressively increases to compensate for the decrease in the strength of chemical discharged from the chemical tank. Hitherto there was no provision for filling or providing a fixed or uniform quantity of water in each bucket of a water wheel designed to control the supply of chemical to a settling tank as will be quite apparent to those skilled in the art.

The drum 14 is driven through a friction coupling indicated at 18 which permits the drum to be restored to a starting position each time the chemical is practically exhausted in the chemical tank.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

Liquid treating apparatus including a source of liquid; a settling tank; a chemical tank; means for supplying chemical from the chemical tank to the liquid in proportion to the liquid admitted to the settling tank; and a wheel controlling said means, said wheel having propelling buckets which are arranged successively to receive liquid flowing from the source of liquid and which are constructed to receive fixed quantities of liquid before liquid may be discharged therefrom whereby the rotation of the wheel is proportional to the flow of liquid to the settling tank to render the proportion of chemical and liquid treated thereby substantially constant.

In witness whereof, I hereunto subscribe my name this 1st day of March, A. D. 1916.

KENT W. BARTLETT.

Witnesses:
JNO. J. FELSEEKER,
P. S. GRAVER.